US011509978B1

(12) United States Patent
Aggarwal et al.

(10) Patent No.: US 11,509,978 B1
(45) Date of Patent: Nov. 22, 2022

(54) REORDERING LOW-PRIORITY EXPLICIT BACKUP ROUTES TO FOLLOW IMPLICIT BACKUP ROUTES

(71) Applicant: Ciena Corporation, Hanover, MD (US)

(72) Inventors: Manish Aggarwal, New Delhi (IN); Sandeep Kumar Gupta, Gurgaon (IN); Vikas Chander, Sonipat (IN); Rashmi Kathuria, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/467,500

(22) Filed: Sep. 7, 2021

(30) Foreign Application Priority Data

Jul. 23, 2021 (IN) .............................. 202111033159

(51) Int. Cl.
*H04B 10/032* (2013.01)
*H04Q 11/00* (2006.01)
*H04L 45/28* (2022.01)

(52) U.S. Cl.
CPC ......... *H04Q 11/0005* (2013.01); *H04L 45/28* (2013.01); *H04Q 2011/0043* (2013.01)

(58) Field of Classification Search
CPC .................................................... H04B 10/032
See application file for complete search history.

(56) References Cited

U.S. PATENT DOCUMENTS

| 8,854,955 | B2 | 10/2014 | Prakash et al. |
| 9,124,960 | B2 | 9/2015 | Swinkels et al. |
| 9,800,522 | B2 | 10/2017 | Chhillar et al. |
| 9,860,314 | B2 | 1/2018 | Kore et al. |
| 10,110,438 | B2 | 10/2018 | Prakash et al. |
| 10,680,739 | B2 | 6/2020 | Swinkels et al. |
| 10,958,993 | B2 | 3/2021 | Swinkels et al. |
| 2010/0104282 | A1* | 4/2010 | Khan ...................... H04L 45/00 398/45 |
| 2018/0212866 | A1* | 7/2018 | Kumar .................... H04L 41/40 |
| 2018/0278512 | A1* | 9/2018 | Olofsson ................. H04L 47/20 |

* cited by examiner

*Primary Examiner* — Shi K Li
(74) *Attorney, Agent, or Firm* — Clements Bernard Baratta; Lawrence A. Baratta, Jr.; Christopher L. Bernard

(57) ABSTRACT

Systems and methods for utilizing backup paths to restore service in a network are provided. A method, according to one implementation, includes obtaining a route list as defined by a user, the route list including a plurality of explicitly-configured backup routes for restoring service between a source node and a destination node in a network when a working route is unavailable. The method also includes receiving input designating one or more of the explicitly-configured backup routes as one or more last-resort routes. In response to determining that the working route is unavailable and that the plurality of explicitly-configured backup routes, excluding the one or more last-resort routes, are unavailable, the method includes automatically computing one or more implicitly-computed backup routes. For restoring service between the source node and destination node, the method also includes utilizing one of the one or more implicitly-computed backup routes before utilizing one of the one or more last-resort routes.

20 Claims, 6 Drawing Sheets

REORDERING LOW-PRIORITY EXPLICIT BACKUP ROUTES TO FOLLOW IMPLICIT BACKUP ROUTES

TECHNICAL FIELD

The present disclosure generally relates to networking systems. More particularly, the present disclosure relates to systems and methods for creating a list of backup routes to be used when a working route is unavailable and reordering the list such that low-priority explicit backup routes follow after implicit backup routes.

BACKGROUND

Generally, in a Layer 0 Control Plane (L0CP) for controlling data transmission routes in an optical (or photonic) network, a working route may be established as having the highest priority. Thus, when there are no faults or other issues along this preferred route, the L0CP will maintain transmission along the working route. Many networks will often have backup routes (or restoration paths) that can be used as secondary paths or protection paths to restore data transmission when a fault is detected on the primary (or preferred) route. A typical restoration procedure involves switching from the working route to a backup route.

Backup (restoration) routes may be configured in one of two different ways. A first way of configuring a backup route, referred to as an "explicit" route, is by allowing a user to manually define the backup route. A second way of configuring a backup route, referred to as an "implicit" route, is by allowing a L0CP controller to automatically determine the backup route. Using these two techniques, multiple explicit backup routes and multiple implicit backup routes may be defined. Normally, the working route and the multiple backup routes are stored in a list, which include the order in which the different routes are attempted if the higher-priority routes are unavailable. The list may be referred to as a Designated Transit List (DTL). Thus, if the working route fails, the first backup route in the list will be attempted. If that one fails too, the next backup route is attempted, and so on.

The number of backup routes in the DTL may be limited. Routes that are referred to as "cascaded routes" may include "regeneration" at a regeneration site. In this case, regeneration may refer to a renewal or rebuilding process for re-establishing an optical signal. One issue is that this regeneration process is typically not a desirable path, because it can be more costly and requires the use of additional transponders. Even though explicit backup routes may include regeneration and are typically listed last in the explicit list, they will be attempted first before other more efficient implicit routes are computed and attempted. Nevertheless, there is currently no mechanism to enable implicit routes to be attempted before explicit routes, even though some implicit routes may provide better results than some explicit routes. Therefore, there is a need in the field of photonic networks to allow the list of backup paths to be reordered to allow some less-desirable explicit routes to be attempted after any more-desirable implicit routes.

BRIEF SUMMARY

The present disclosure is directed to systems and methods for creating a list of routes to be used for providing a service in a network. The list of routes may include user-defined routes as well as computer-configured routes. Normally, the user-defined routes are attempted for use as backup routes to restore the service as needed and thereafter the computer-configured routes may be attempted. However, in the present disclosure, the user is given the opportunity to configure one or more of the backup routes as a "last resort" only to be used when all other routes, including the computer-configured routes, have been exhausted.

According to one implementation of the present disclosure, a method includes the step of obtaining a route list as defined by a user. The route list includes a plurality of explicitly-configured backup routes for restoring service between a source node and a destination node in a network when a working route is unavailable. The method also includes the step of receiving input designating one or more of the plurality of explicitly-configured backup routes as one or more last-resort routes. In response to determining that the working route is unavailable and that the plurality of explicitly-configured backup routes, excluding the one or more last-resort routes, are unavailable, the method further includes the step of automatically computing one or more implicitly-computed backup routes. For restoring service between the source node and destination node, the method is configured to utilize one of the one or more implicitly-computed backup routes before utilizing one of the one or more last-resort routes.

In some embodiments, the one or more last-resort routes may include a path through a regeneration site where signals are regenerated. Alternatively, the one or more last-resort routes may include a path through a link determined to be less reliable than other links in network. The implicitly-computed backup routes may be computed using a Layer 0 Control Plane (L0CP) controller configured for performing switching and routing procedures for optical signals in an optical network. According to some embodiments, the route list may be a Designated Transit List (DTL).

Furthermore, according to some embodiments, the method may further include the step of giving the last-resort routes a lower priority in the route list than the other explicitly-configured backup routes. In some embodiments, the route list may include an order that determines which route is attempted next for restoring service when routes higher in the order have been exhausted. Also, the method may further include the steps of pre-computing the one or more implicitly-computed backup routes and then placing the one or more implicitly-computed backup routes in the route list before the last-resort routes.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
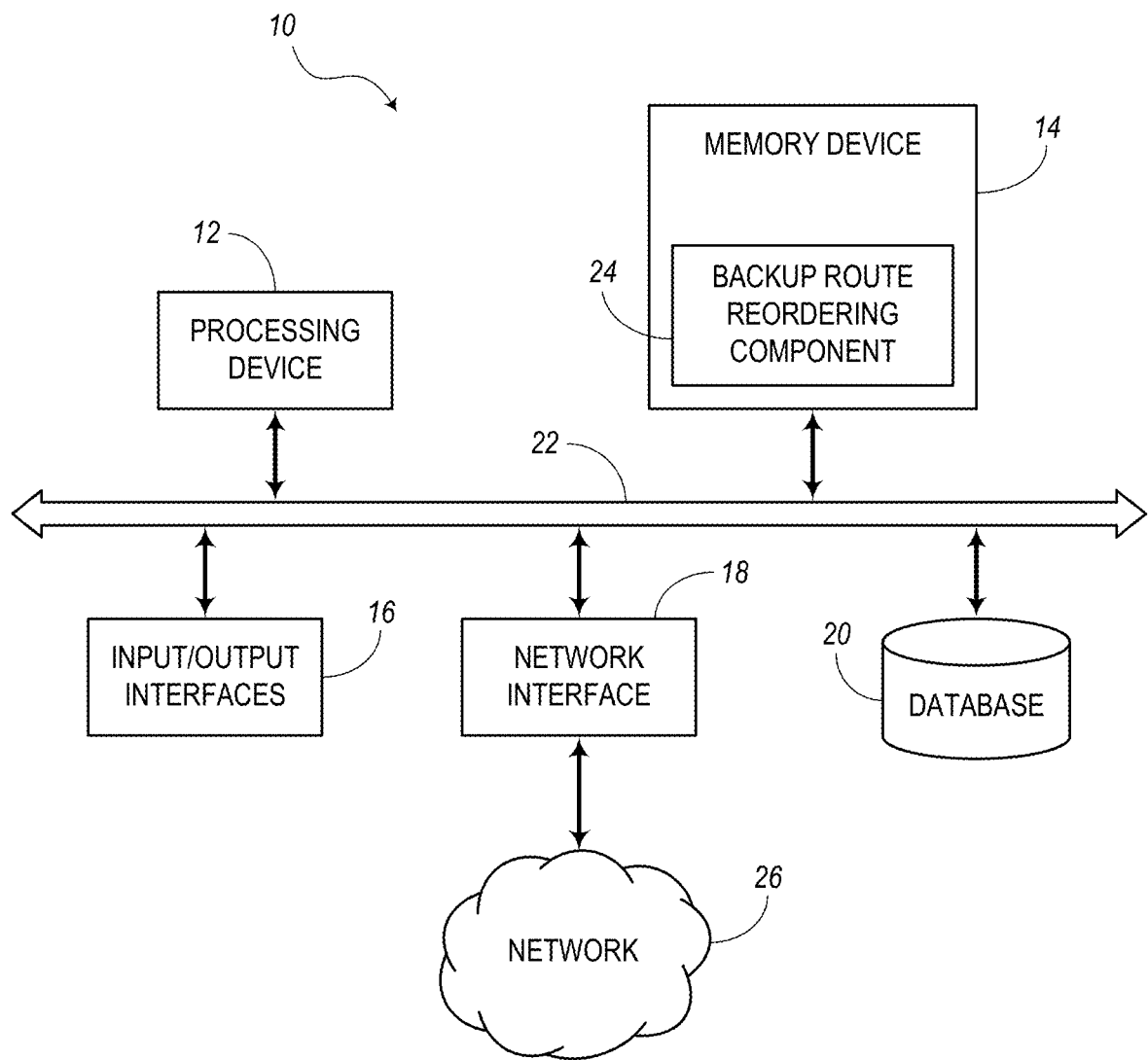
FIG. 1 is a block diagram illustrating a Layer 0 Control Plane (L0CP) controller for creating and reordering a list of backup routes in a photonic network, according to various embodiments of the present disclosure.

The present disclosure relates to systems and methods for creating a list of possible routes along which optical signals may be transmitted in a photonic network. The list of routes (e.g., Designated Transit List (DTL)) may include an order that defines the priority of each of the routes. A route listed higher in the list is given a higher priority and will be attempted first before a lower-priority route. Conventional systems include an order where explicit routes are attempted first and implicit routes are attempted only after all the explicit routes have been exhausted. However, based on the embodiments of the present disclosure, this typical way of ordering backup routes is changed.

It should be noted that conventional systems for computing implicit paths do not work with regeneration routes, since they will normally create a pass-through connection at the regeneration site that bypasses the regeneration operations. As such, traffic may remain down, especially if the path is long and the Optical Signal to Noise Ratio (OSNR) requirements are not met. Also, current non-viable DTLs may include a mechanism to ignore a DTL altogether. Some conventional networks may have multiple routes, but do not want to limit the network by picking only the explicit routes. Currently, there is no such mechanism in the conventional systems to allow a user to select a low priority route (e.g., a regeneration-based path) as a "last resort" and utilize these paths only if there are no other feasible paths available. Conventional implementations do not have an option to configure a particular route as a last resort for a particular service. That is, the conventional DTL does not have a "least priority" definition so that service could be restored on a corresponding route only if no other alternative routes are available.

Thus, the present disclosure is configured to overcome the deficiencies of the conventional systems to provide a way to define an explicit route as a last resort in the DTL, such that these lowest-priority routes are used only if no other valid routes are available. According to the various embodiments of the present disclosure, some explicit backup routes can be designated as last-resort routes and are reordered such that implicit routes can be attempted before these last-resort routes. In other embodiments, some routes may be defined as non-viable routes and can be ignored in the DTL altogether. The present disclosure provides systems and methods to configure least-preferred explicit routes to have a priority lower than implicit routes.

In many cases, the least-preferred explicit routes can be described as regeneration routes. However, it should be noted that these least-preferred or lowest-priority routes may include other types of routes, even those not related to regeneration. Nevertheless, when applied for regeneration paths, it may be known that using a path that includes regeneration processes is usually a costly affair for the customer, since it consumes an extra set of transponders. In order to save costs, a customer may normally want to use any regeneration path as a last resort only.

Conventional Layer 0 Control Plane (L0CP) implementation requires explicit configuration of cascaded routes inside a DTL. The implicit path computation does not support auto-calculation of paths that include regenerations, which causes direct pass-through connections through the regeneration site. This may lead to no recovery of the traffic since required OSNR criteria is not met, especially if the corresponding path is extremely long, which is usually the case for most regeneration paths.

Conventional systems support regeneration only with explicit cascaded route configurations and are configured to list corresponding protection paths with cascaded routes last in the DTL while other possible protection routes are higher in the list. This conventional approach suffers from the following limitations. First, for configuring DTLs with explicit protection routes, corresponding protect routes (other than cascaded routes) should be known in advance. Also, the number of protection routes that can be configured inside a DTL is limited and does not include all possible combinations for a large network. In some cases, all explicitly configured protection routes (configured before the cascaded routes) might become invalid and the cascaded route can be chosen irrespective of other implicit protection paths available in the network which do not include regeneration or other undesirable processes.

Additional problems with the conventional approach are that it does not work where a customer configures only non-regeneration explicit paths in the DTL. In this case, if all explicit routes are invalid, a) the LOCP might computes implicit routes which may compute the same route as a cascaded route but that causes service to ignore the regeneration actions and creates direct pass-through connections from the regeneration site to bypass the regeneration actions. This may cause traffic to remain down, since required OSNR may not be met for long paths.

Thus, the embodiments of the present disclosure include mechanisms to utilize regeneration paths and other lower-priority paths as a last resort. As such, it may be possible to utilize the L0CP controllers to keep on searching for routes (e.g., non-regeneration paths) and continuing attempting to restore service. In case all higher priority routes are exhausted, the L0CP controllers of the present disclosure are configured to pick up the cascaded routes as a last resort.

As mentioned above, picking an explicitly-configured regeneration path is a costly solution. This path can be avoided if L0CP controllers can implicitly calculate one or more possible paths that do not include regeneration. Therefore, it can be requested that any cascaded route is selected as a last resort route for restoring any service on that path from one node to another.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment a Layer 0 Control Plane (L0CP) controller 10 for creating and reordering a list of backup routes in a photonic network 26. The L0CP controller 10 may be configured for performing switching and routing procedures for optical signals in the photonic network 26. In the illustrated embodiment, the L0CP controller 10 may be a digital computing device that generally includes a processing device 12, a memory device 14, Input/Output (I/O) interfaces 16, a network interface 18, and a database 20. It should be appreciated that FIG. 1 depicts the L0CP controller 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the L0CP controller 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the L0CP controller 10 and may include, for example, an internal hard drive connected to the local interface 22 in the L0CP controller 10. Additionally, in another embodiment, the data store may be located external to the L0CP controller 10 and may include, for example, an external hard drive connected to the Input/Output (I/O) interfaces 16 (e.g., SCSI or USB connection). In a further embodiment, the data store may be connected to the L0CP controller 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 18 may be used to enable the L0CP controller 10 to communicate over a network, such as the photonic network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the photonic network 26.

The L0CP controller 10 may further include a backup route reordering component 24. In some embodiments, the backup route reordering component 24 may be a Centralized Offline Planning Tool, a Centralized Online Planning Tool, a Network Element Level tool, or other suitable tool for creating and/or reordering a list of routes within a DTL to rearrange the order in which each route is considered for use, particular for rearranging the order of the implementation of backup routes.

In some embodiments, the backup route reordering component 24 may be implemented in software and/or firmware as a logically-executed program and stored in the memory device 14 or other suitable non-transitory computer-readable medium. In other embodiments, the backup route reordering component 24 may be implemented in hardware and configured in the processing device 12. In still other embodiments, the backup route reordering component 24 may be implemented in any suitable combination of hardware, software, and/or firmware. The backup route reordering component 24 may include logic instructions configured to cause or enable the processing device 12 to execute various steps or actions in order to create and reorder a list of routes, such as a working route and one or more backup routes, where the backup routes may be used to restore service in the photonic network 26 if the working route is down or unavailable for any reason.

More particular, the backup routes may be reordered by the backup route reordering component 24 in a manner such that one or more explicitly-configured routes designated as having a lower priority can be moved to the end of the list and can even be moved to a position after any implicitly-computed routes. A working path (or primary path or main path) is the highest priority route. One or more backup routes can be established and listed in a particular order, whereby, if the working path goes down, the first backup route in the route can be attempted next. If this path does not work, the next backup route can be attempted, and so on down through the list.

The backup route reordering component 24 may be configured to enable the processing device 12 to obtain a route list having a plurality of explicitly-configured routes and one or more implicitly-computed routes. In other embodiments, the implicitly-computed routes may not be computed beforehand, but can be computed after all the explicitly-configured routes are exhausted. Each of the plurality of explicitly-configured routes is a route configured by a user, and each of the one or more implicitly-computed routes is a route that is automatically computed. The explicitly-configured routes may normally be given a higher priority than the implicitly-computed routes in the route list. Alternatively, in some embodiments, the explicitly-configured routes may be attempted first before the implicitly-computed routes are computed and attempted.

Responsive to determining that one or more of the plurality of explicitly-configured routes includes one or more last resort routes that meet a low-priority standard (or meet a last-resort parameter), the backup route reordering component 24 may further be configured to enable the processing device 12 to change the order of priority of the one or more last resort routes (that meet the low-priority standard) to a position below the implicitly-computed routes in the route list. This may be done such that the implicitly-computed routes are configured to be attempted before the one or more last resort routes (meeting the low-priority standard). In some cases, the order in the list may show a priority, where the highest in the list is highest in the priority. Also, attempts to use the backup routes (when needed) follow this order as well, starting from the top of the list to the bottom.

In some embodiments, the backup route reordering component 24 may be configured such that the one or more last resort (explicitly-configured) routes (meeting the low-priority standard) may include one or more regeneration routes through a regeneration site where optical signals are regenerated. The one or more explicitly-configured routes meeting the low-priority standard may include one or more routes through links determined to be less reliable than other links in the photonic network 26. The route list may be a Designated Transit List (DTL). The low-priority standard may define criteria whereby a route is usable as a last resort. The backup route reordering component 24 may further be configured to enable a user to specify the one or more explicitly-configured routes meeting the low-priority standard and/or enable the user to list the one or more routes as "last resort" routes. The backup route reordering component 24 may also be configured to enable creation of a first item to recognize the working route and enable creation of a first list to include a high-priority set of protection routes and a second list to include the "last resort" routes to be attempted after the implicitly-computed routes.

Figure 2:
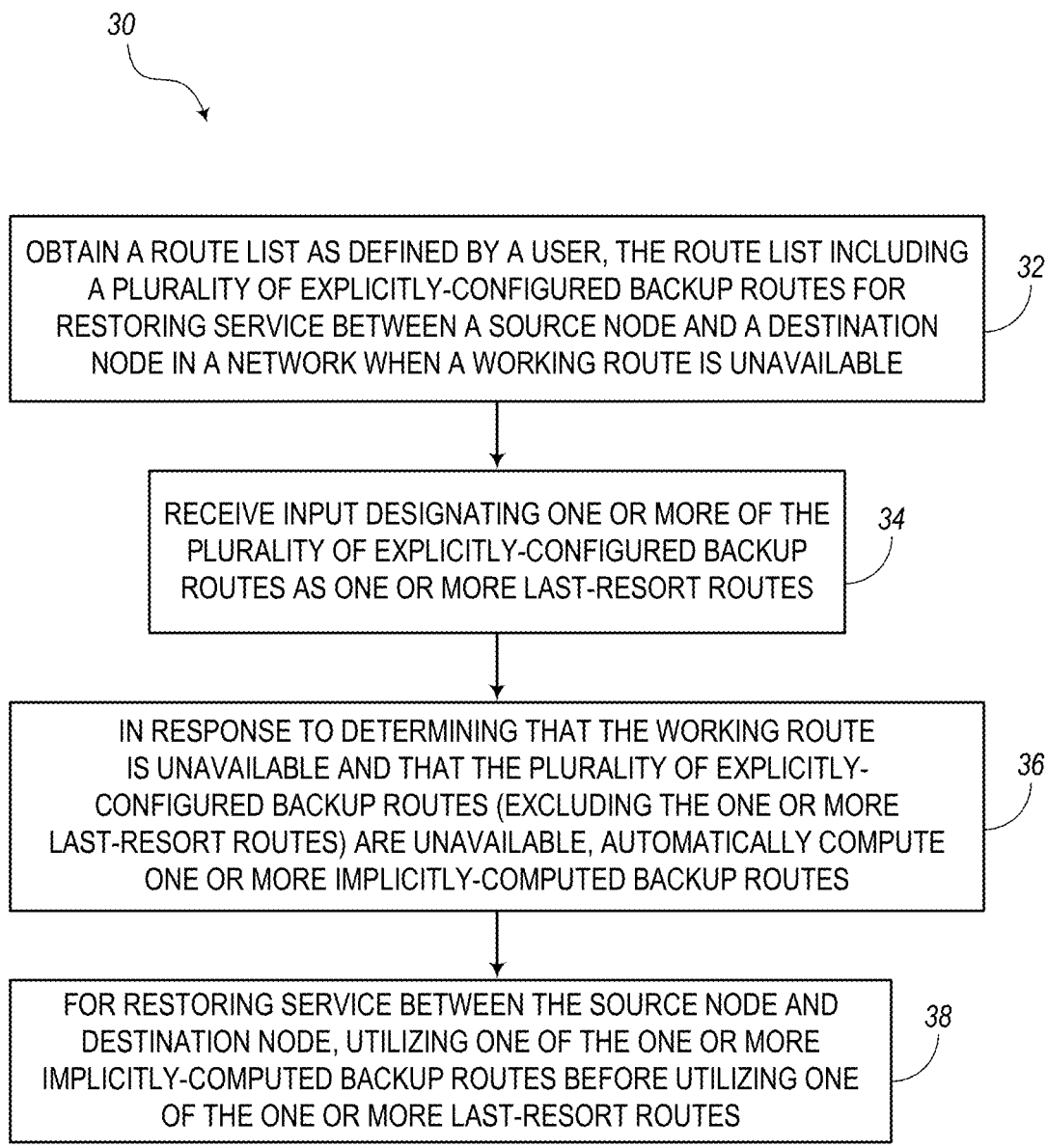
FIG. 2 is a flow diagram illustrating a process for reordering a list of backup paths for restoring a service in a photonic network, according to various embodiments of the present disclosure.

FIG. 2 is a flow diagram illustrating an embodiment of a process 30 for creating a route list and reordering the backup paths in the route list to determine an order in which the backup paths may be attempted for restoring a service in a communications network (e.g., photonic network 26). In this embodiment, the process 30 includes a step of obtaining a route list as defined by a user, as indicated in block 32, wherein the route list includes a plurality of explicitly-configured backup routes for restoring service between a source node and a destination node in a network when a working route is unavailable. The process 30 also includes the step of receiving input designating one or more of the plurality of explicitly-configured backup routes as one or more last-resort routes, as indicated in block 34. In response to determining that the working route is unavailable and that the plurality of explicitly-configured backup routes, excluding the one or more last-resort routes, are unavailable, the process 30 further includes the step of automatically computing one or more implicitly-computed backup routes, as indicated in block 36. For restoring service between the source node and destination node, the process 30 includes the step of utilizing one of the one or more implicitly-computed backup routes before utilizing one of the one or more last-resort routes, as indicated in block 38.

Furthermore, according to some embodiments, the process 30 may include additional steps or features. For example, the one or more last-resort routes may include a path through a regeneration site where signals are regenerated. The one or more last-resort routes may alternatively include a path through a link determined to be less reliable than other links in network. The implicitly-computed backup routes may be computed, for example, using a Layer 0 Control Plane (L0CP) controller configured for performing switching and routing procedures for optical signals in an optical network. The route list may be a Designated Transit List (DTL). The process 30 may further include the step of giving the last-resort routes a lower priority in the route list than the other explicitly-configured backup routes. The route list may include an order that determines which route is attempted next for restoring service when routes higher in the order have been exhausted. In addition, the process 30 may further comprise the steps of pre-computing the one or more implicitly-computed backup routes and then placing the one or more implicitly-computed backup routes in the route list before the last-resort routes.

In addition to these implementations, the present disclosure may include other processes for use in this environment. For example, one process may also include obtaining a route list with a working path and backup or restoration paths. Restoration in this case may refer to restoring service when the working path is faulty and is not necessarily related to "regeneration" processes described herein. This process may include obtaining this route list having a plurality of explicitly-configured routes and one or more implicitly-computed routes, where each of the plurality of explicitly-configured routes may be a route configured by a user and each of the one or more implicitly-computed routes is a route that is automatically computed. The explicitly-configured routes may normally be given a higher priority than the implicitly-computed routes in the route list. In other words, the explicitly-configured routes may be attempted first before the implicitly-computed routes are computed and attempted. Responsive to determining that one or more of the plurality of explicitly-configured routes include one or more last resort routes that meet a low-priority standard, some processes may include utilizing a last-resort parameter and may include the step of changing the order of priority of the one or more last resort routes (that meet the low-priority standard) to a position below the implicitly-computed routes in the route list. As such, the implicitly-computed routes are configured to be attempted before the one or more last resort routes. For instance, the order in the list shows the priority where highest in the list is highest in the priority. Also, attempts to use the backup routes (when needed) includes this order, starting from the top of the list to the bottom. A user may be configured to specify the one or more explicitly-configured routes meeting the low-priority standard or the user may list the one or more routes as "last resort" routes in a separate or the same list. Another list may include the implicitly-computed routes.

Figure 3:
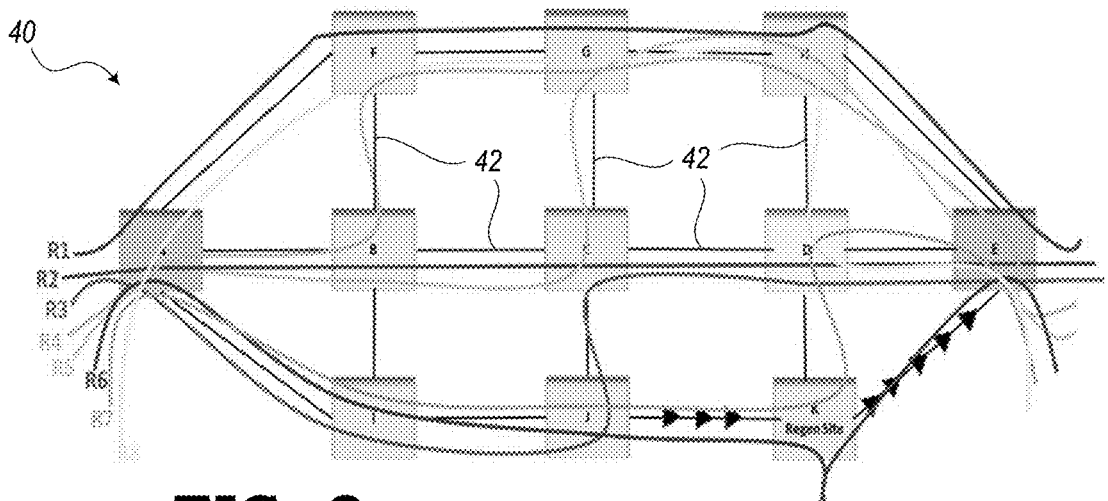
FIG. 3 is a block diagram illustrating a photonic network having a plurality of nodes and a plurality of possible routes from a source node to a destination node, according to various embodiments.

FIG. 3 is a block diagram illustrating an embodiment of a photonic network 40 (e.g., photonic network 26). In this embodiment, the photonic network 40 includes a plurality of nodes (e.g., Node A, Node B, . . . , Node K) interconnected by a plurality of links 42. In this example, Node A may be considered to be a source node and Node E may be considered to be a destination node. Also shown in FIG. 3 are a plurality of possible routes R1, R2, . . . , R8 from the source node (i.e., Node A) to the destination node (i.e., Node E) for providing a service.

Suppose in this case that a network operator wants to use a regeneration path (i.e., R6) as a last resort only, which may be designated as a last resort path due to the extra transponder costs involved in the regeneration path. Thus, it may be desired that the service is moved to this regeneration path (R6) only if no other paths are available. The other routes (i.e., R1, R2, R3, R4, R5, R7, and R8) may be designated as feasible non-regeneration paths that satisfy user-defined constraints (e.g., constraints applied by the network operator).

To understand the existing problem, the following use cases may be considered. With explicitly-configured routing, the conventional implementations may configure a limited number of protection paths inside the DTL (e.g., up to five protection paths). The service is configured with a DTL that include one "working" path (e.g., R1), which is the primary route and one or more protection paths (e.g., R2, R3, R4, R5, and R6), where R6 may be considered to be a cascaded path. In this example, routes R7 and R8 may be possible implicitly-computed protection routes.

Figure 4:
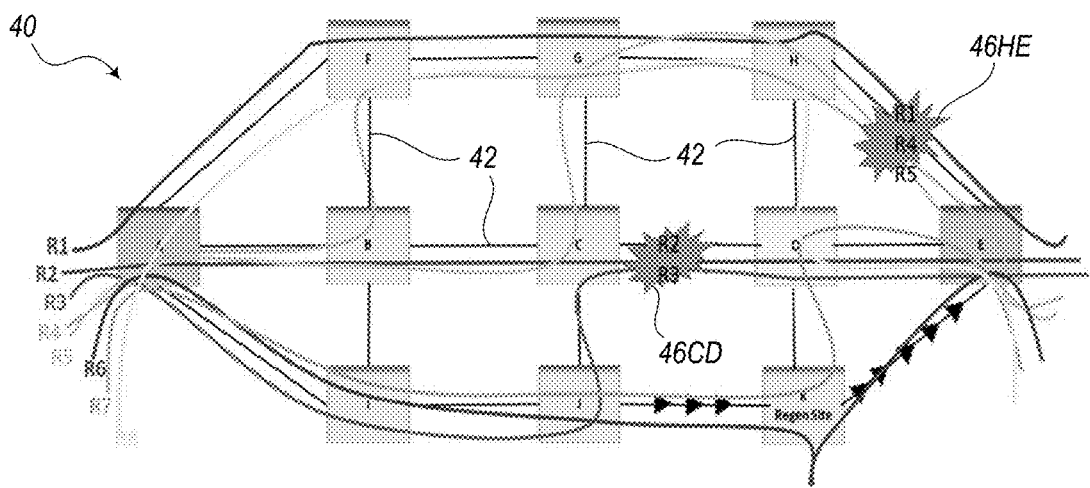
FIG. 4 is a block diagram illustrating the photonic network of FIG. 3 where some routes are unavailable, according to various embodiments.

FIG. 4 shows an example where the photonic network 40 of FIG. 3 is in a state where some routes are unavailable. Suppose, for example, that the photonic network 40 experiences a fault 46HE (e.g., fiber cut) on the link 42 between Nodes H and E. The fault 46HE in this case causes routes R1, R4, and R5 to become unavailable (or invalid). In this example, another fault (i.e., fault 46CD), which may also be a cut in the fiber, exists in the photonic network 40. The fault 46CD in this case is on link 42 between Node C and Node D, which causes routes R2 and R3 to become unavailable or invalid.

In this example, the fiber cuts 46HE and 46CD cause the service to restore on route R6 (e.g., the regeneration or cascaded route). As described with respect to the conventional solutions, this will normally be a costly affair for the customer since the service would need to use an extra set of transponders. However, in this example, other routes (i.e., implicitly-computed routes R7 and R8) are available. The conventional solution would thereby utilize the regeneration route R6, which is still available in this example, before considering routes R7 and R8.

As shown in this example, the conventional solution allows the user to add the cascaded route R6 last in the list (e.g., DTL). The user is limited to the number of protection routes in a DTL, which causes the customer to lose on possible implicit routes that could be used to restore the service and would be less costly.

However, in this case, the user in the conventional case may choose not to configure the cascaded route R6 in the DTL. In this situation, when all the other protection routes (e.g., R1, R2, R3, R4, and R5) configured in the DTL are invalid (e.g., due to faults 46HE and 46DC, the following actions would occur. The conventional L0CP may compute an implicit path, but it does not select the cascaded route R6, since there is no such mechanism available in the conventional systems.

Some protocols for defining photonic switching and routing processes (e.g., Optical Switching and Routing Protocol (OSRP), Automatically Switched Optical Network (ASON), Generalized Multi-Protocol Label Switching (GMPLS), etc.) may be utilized by the L0CP controller 10 to restore a downed service to an implicitly-computed route whose constituting links resemble the cascaded route R6. However, in this case, the traffic may remain down since regeneration paths may be longer distance paths where the required OSNR criteria are not met.

However, to overcome this problem in the conventional systems, the present disclosure provides various solutions. Particularly, the LOCP controller 10, while operating the instructions of the backup route reordering component 24, is configured to provide a way to allow the user (e.g., network operator) to designate a particular route as a last resort route for a particular service.

With implicit routing, again the conventional systems do not provide such mechanisms for LOCP to support creation of a regeneration path. With restoration of the service to an implicit route whose constituting links resemble the cascaded route R6 in the conventional systems, the traffic may remain down since regeneration paths are typically long distance paths that do not meet the required OSNR criteria. The backup route reordering component 24 of the LOCP controller 10, however, is configured to overcome these issues.

For example, the problem can be resolved the LOCP controller 10 by enabling the backup route reordering component 24 to restore a service on a regeneration path as a last resort. The service can be restored on the regeneration path (R6) in the case where all other paths (including implicit paths) get exhausted and there are no other feasible paths available.

In this respect, the protocols of the LOCP controller 10, as described in the present disclosure, may be configured with a new parameter, which may be referred as a "last-resort route" or a set of last-resort routes (e.g., Last Resort DTL SET or "LRDTLSET") for LOCP enabled services. The last-resort route (or LRDTLSET) parameter may provide the following functionality:

1. For a service, LRDTLSET may contain a list of user-defined routes which can be considered as a last resort for restoration, which may be the list of routes that the user wants the corresponding service to route to in case there are no other feasible routes available in the network which are not part of the LRDTLSET.

2. Paths configured in LRDTLSET may be ignored until a time when the LOCP controller 10 has another valid path available, such as the routes configured in the LRDTLSET that can be considered in the last place when all other paths are exhausted.

3. When system get exhausted of any other valid paths, then the LRDTLSET path (e.g., one of the Last Resort routes) may be chosen for restoration.

4. LRDTLSET may include both normal routes and cascaded routes.

5. For all implicitly-computed (or implicitly-computed) routes, the LOCP controller 10 may compare links that constitute the implicit path with those of the DTL. The cascaded routes may be configured in the LRDTLSET. If all links match, the LOCP controller 10 may look for an alternative route other than those configured in the LRDTLSET. If no routes are found, then it will restore the service on that implicitly-computed route for which all corresponding links match with a route in the LRDTLSET.

6. In the case where the implicitly calculated route matches with a cascaded route configured inside the LRDTLSET, the service may be restored to the corresponding cascaded route only if it gets validated (i.e., if regeneration ports are available). Otherwise, the LOCP controller 10 may look for an alternative path for the service.

7. The same route cannot be part of the DTL and the LRDTLSET for a service.

The LRDTLSET can be utilized for the following use-cases:

1. Regeneration-based cost-effective customer solution: In this case, a customer can configure the cascaded route in the LRDTLSET. This case may be based on an assumption that customers plan the regeneration site appropriately based on link budgets and therefore proposed algorithms that will ignore direct pass-through from that site.

2. High reliability customer solution: In this case, the customer can configure DTLs, which may contain less reliable links than the last resort paths or links. In this case, the traffic impact or service degrade can be minimized.

Use-Case 1: LRDTLSET with Explicit Protect Route

To understand the above solution, consider an example where the LRDTLSET has an Explicit Protect Route, where reference is made again to FIG. 3.

1. The service is configured with a DTL, where the working route is configured as R1 and the protection routes are configured as R2, R3, R4, and R5. Also, the LTDTLSET in this case may include route R6 (cascaded route) and routes R7 and R8 again are possible implicit protect routes.

2. Suppose in this case that the photonic network 40, similar to the above case, experiences fiber cut 46HE on the link 42 between Node H and Node E, which causes routes R1, R4 and R5 to become invalid, fiber cut 46CD between Node C and Node D, which causes routes R2 and R3 to become invalid. The photonic network 40 again will look like FIG. 4.

3. The fiber cuts 46HE, 46CD cause the LOCP service to restore on implicit route R7 (since no explicit routes are valid in this case). The LOCP controller 10 can ignore the path A-I-J-K-E since the last-resort route R6 is also using the corresponding links.

4. Suppose the photonic network 40 experiences another fiber cut on the link 42 between Node D and Node E, as described with respect to FIG. 5. This fiber cut causes routes R7 and R8 to go invalid as well.

Figure 5:
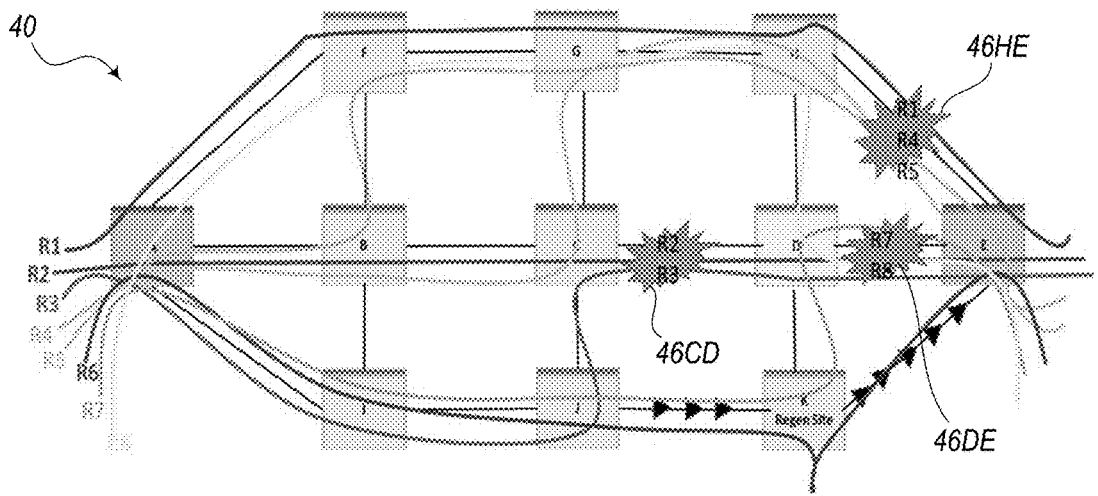
FIG. 5 is a block diagram illustrating the photonic network of FIG. 3 where additional routes are unavailable, according to various embodiments.

FIG. 5 shows the photonic network 40 where additional routes are unavailable. In addition to fiber cuts 46HE and 46CD, this example also includes a situation where the photonic network 40 experiences another fiber cut 46DE between Node D and Node E. In this additional condition:

5. The fiber cut 46DE forces the LOCP controller 10 to compute implicit routes, since there are no other feasible routes present other than A-I-J-K-E. Since the corresponding links match with those of the cascaded route R6 configured in LRDTLSET, the LOCP controller 10 may be configured to select the regeneration path R6 to restore the service.

6. The LOCP controller 10 may also be configured to ignore the pass-through (i.e., A-I-J-K-E) calculated path (i.e., non-regenerating route R6), since the cascaded route R6 was configured in the LRDTLSET.

Use Case 2: LRDTLSET with Implicit Protect Route

In the case where LRDTLSET is implemented with implicitly-computed backup routes, the photonic network 40 in the state shown in FIG. 5 may again be considered. In this example, only the working route (i.e., route R1) is configured in the DTL and the route R6 is configured as a last-resort route in the LRDTLSET:

1. Initially, the LOCP controller 10 will pick route R1 for providing the service as R1 is the working path. Also, the LOCP controller 10 may calculate backup (protect) routes implicitly. Protect path calculation by the LOCP controller 10 may be configured to ignore any path configured in the LRDTLSET until the time when there are no other paths available.

2. In case of a failure in route R1, the LOCP controller 10 will control the photonic network 40 to switch from the primary working route R1 to a restoration route, which may be the first calculated path as per cost criteria selected by the user.

3. In case all other implicit paths go invalid (as shown in FIG. 5), the LOCP controller 10 causes the service to be restored on the cascaded route R6, since implicit path A-I-J-K-E matches with this route.

The above techniques, processes, algorithms, etc. may be configured to ensure only if all other routes are exhausted, then path with regeneration (or other lower priority condition) path is used. These techniques or algorithms may provide a best effort approach to consider a route in a DTL as a last resort to restore the service when no other alternative paths are available. The last-resort parameter could be a regeneration or non-regeneration path.

Figure 6A:
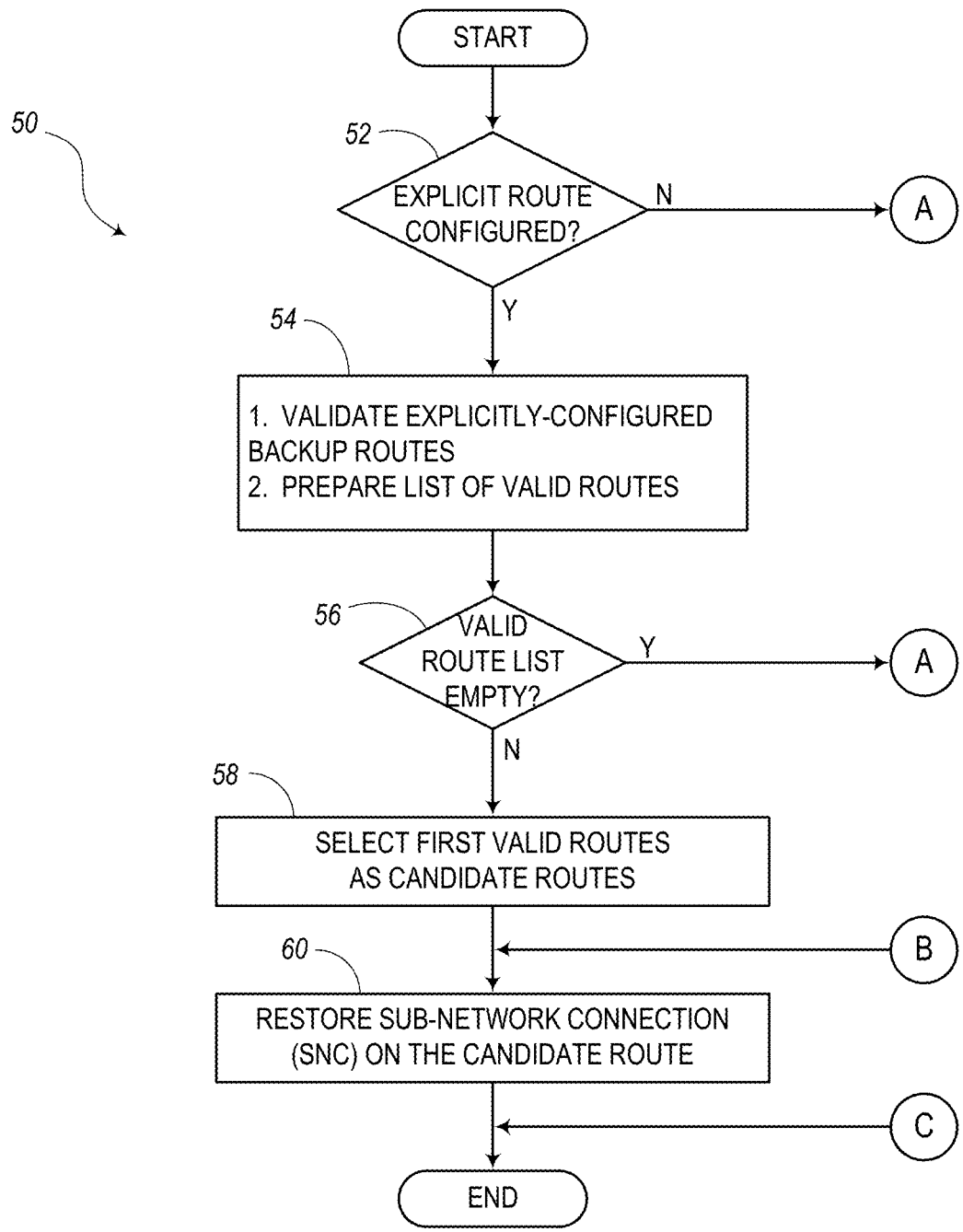
FIGS. 6A-6C, in combination, form a flow diagram illustrating a process including a number of operations to be performed by the L0CP controller of FIG. 1, according to various embodiments of the present disclosure.
Figure 6B:
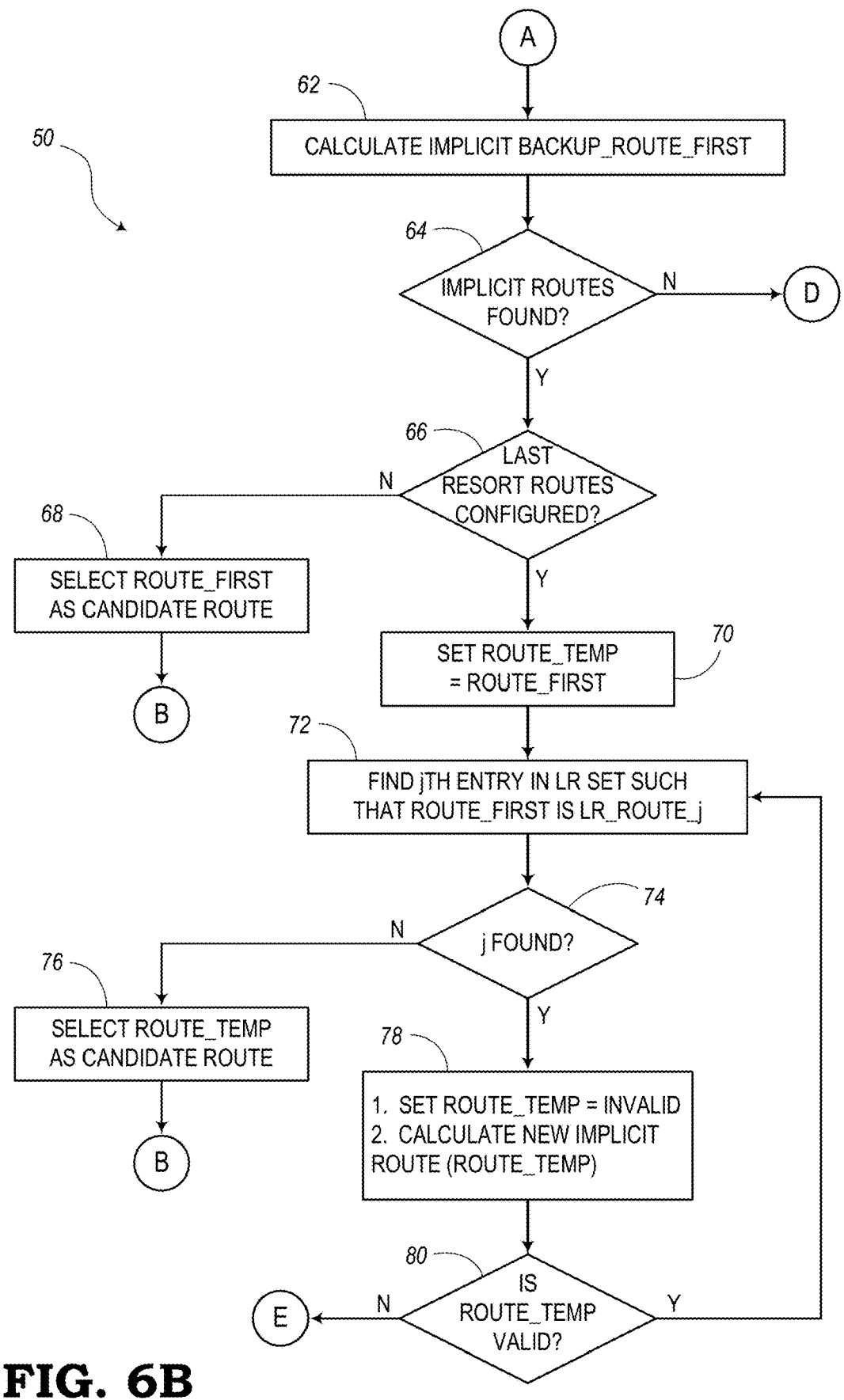
Figure 6C:
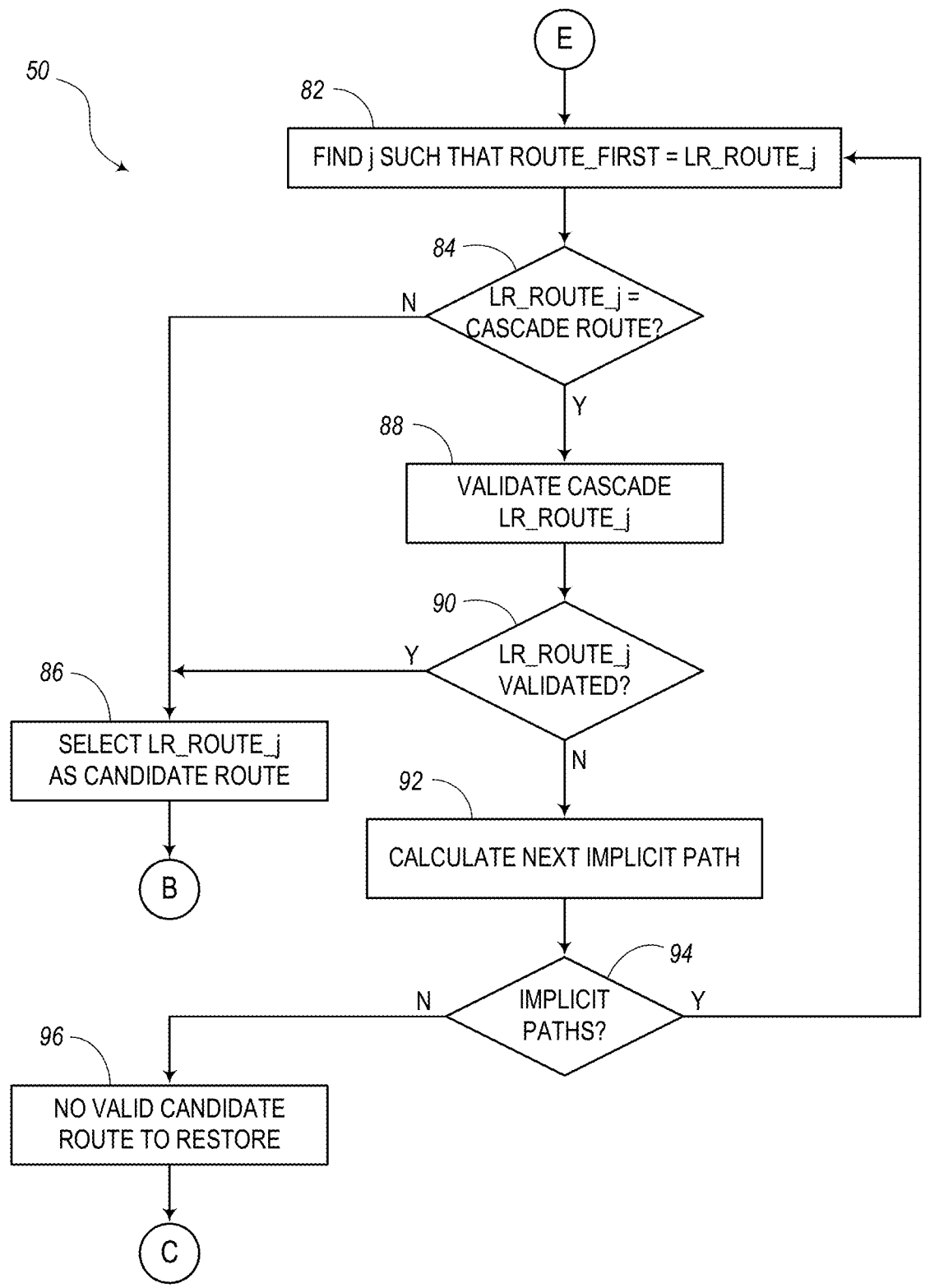

FIGS. 6A-6C (collectively referred to as FIG. 6) show a process 50 configured to be performed by the LOCP controller 10 of FIG. 1 or other suitable control device. For instance, the process 50 includes a set of operations that can be repeated for each LOCP service in a network (e.g., photonic network 26, 40) during path computation/validation procedures. The process 50 may include creating a route list (e.g., DTL) and reordering the routes in the route list whereby one or more explicitly-configured (e.g., user-defined) backup routes may be moved to a position in the list after one or more implicitly-computed (e.g., automatically determined by a route computing engine). Again, the routes moved within the list may be those routes that are low-priority, costly, low quality, and/or regeneration-processing types of paths. Thus, the implicitly-computed routes in some cases may be considered for use (or attempted) before the lower priority explicit-configured routes.

In the illustrated embodiment of FIG. 6, the process 50 may include checking if explicit routes are configured, as indicated in condition block 52. If so, the process 50 proceeds to block 54, which includes the steps of 1) validating the explicitly-configured backup routes and 2) preparing a list of routes that are valid. Otherwise, the process 50 goes to block 62 where implicit backup routes are calculated. After block 54, the process 50 includes determining if the valid route list is empty, as indicated in condition block 56. If so, the process 50 moves to block 62 for calculating the implicit backup routes. If the valid route list is not empty, the process 50 proceeds to block 58. In block 58, the process 50 includes the step of selecting a first valid route as a candidate route, which may include validating the explicit routes as per an order as provided by the user and setting the first validated explicit route as the candidate route. The process 50 then includes restoring the service or Sub-Network Connection (SNC) on the candidate route, as indicated in block 60. At this point, the process comes to an end.

As shown in block 62, the process 50 includes the step of calculating or computing the first implicit route for the service. Then, the process 50 determines if any implicit routes are found, as indicated in condition block 64. If not, the process 50 jump ahead to block 96. If so, the process 50 goes to condition block 66 to check if the last resort route (LRDTLSET) is configured or not. If it is configured, the process 50 goes to block 70. Otherwise, the process 50 goes to block 68, which includes the step of selecting a first route as the candidate route and then proceeding to block 60.

As indicated in block 70, the process 50 includes the step of setting a temporary route as the first route. For each entry in the LRDTLSET, the process 50 includes finding the jth entry in the LRDTLSET such that the first route is a last-resort route (j), as indicated in block 72. From the first entry until the last entry in LRDTLSET, j is found such that all the corresponding link entries for DTL_temp and LR-DTL_j are same (i.e., DTL_temp==LR_DTL_j). If j is found, as indicated in condition block 74, the process 50 goes to block 78. Otherwise, the process 50 goes to block 76, which includes the step of selecting the temporary route as the candidate route.

Block 78 includes the steps of 1) setting temporary route as invalid (e.g., DTL_temp=Invalid) and 2) calculating a new implicit route, referred to as a temporary route (DTL_temp). The process 50 may try to compute a new implicit route (DTL_temp). If no such routes are found in condition block 80, the process 50 goes to block 82, else block 72. If it is determined in condition block 80 that the temporary route points to a valid route (e.g., if DTL_temp points to a valid DTL), the process 50 finds j such that the first route is a last resort route (DTL_first=LR-DTL_j), as indicated in block 82. The process 50 may select a corresponding implicit route as a candidate route and go to block 60.

If no implicit routes are found in condition block 80 other than Last Resort routes, the process 50 proceeds to block 82. This may include selecting the first route (DTL_first) as if that was the most optimal implicit path. Also, the process 50 may include special handling if corresponding equivalent last-resort route (LR-DTL) is a cascaded route. Condition block 84 include determining whether the last-resort route (LR-DTL_j) is a cascaded route. From the first entry until the last entry in the LRDTLSET, process 50 may find j such that DTL_first=LR-DTL_j. If LR-DTL_j is a cascaded route, the process 50 goes to block 88, which includes the step of validating the cascaded route (CASCADED LR-DTLJ). If it is determined in condition block 84 that the last-resort route is not a cascaded route, then the process 50 goes to block 86, which includes the step of selecting LR-DTL_j as a Candidate DTL and going to block 60.

After block 88, the process 50 includes check if LR-DTL_j is validated (e.g., if a Path Computation Engine (PCE) validates the CASCADED DTL), as indicated in condition block 90. If so, the process goes to block 86. If not, the process 50 proceeds to block 92, which includes the step of calculating the next implicit path (DTL_first) and going to condition block 94. Condition block 94 includes the step of determining if valid candidate implicit routes are found. If so, the process 50 returns back to block 82 for the next j. If a publish route is not found, the process 50 goes to block 96, which includes the step of restoring the service with no valid route on the candidate route and then coming to an end. In some respects, the process 50 may be considered to be one procedure for providing an approach to ignore a route and consider it only as a last resort.

Cascaded DTLs (with regens) may not be given much higher weight in path finding so that they can be used if all other routes are not available. Cascaded DTLs may be supported only with explicit DTL configuration and cost does not play a role in selecting an explicit DTL as a candidate route for restoration. In the case of explicitly-defined user DTLs, the sequence/order in which routes are configured in the DTL defines the priority of the route.

Higher costs usually come into the picture for implicit path computation. However, implicit path computation usually does not support computing/calculating regen-based paths. Therefore, giving much higher "admin weight" in the path finding will not solve the problem. Another point is that the admin weight is configured over links and not for a particular route. Therefore, an increase in admin weight of a particular link may cause the non-regen implicit paths going through the corresponding link to be ignored. This will be applicable for all the service. The present disclosure can provide a "per service based," best-effort, flexible approach to define an explicit route as last resort. This in turn provides a cost-effective mechanism to the customer for routing services on a regen-based path designated as a last resort. The present disclosure provides implementation for defining a least preferred explicit DTL, which may have a priority lower than implicit DTLs, which may be applicable to regen and non-regen use-cases. This has been a common problem for many optical suppliers. If a vendor wants to use a regen path, then the vendor may have to explicitly define regen-based paths (which leads a to higher cost as regen paths need to have additional transponders). This automatically puts regen-based paths to high priority than other non-regen implicit paths, which offers lowers costs for the restoration.

It may be noted that a network operator for managing a network may have different needs from other network operators managing other networks. The data that is received from the user (e.g., network operator) may be different since different people and different system may not share the same "last resort" resources. In this regard, the last resort DTL may be configured per service. Thus, last resort resources may be made available only to those services for which they are defined. If common last resort resources are configured for multiple services, and in the case where multiple such services are affected because of network faults, the present disclosure may be configured to utilize a L0CP device to allocate last resort resources on a first come-first serve basis. Additionally, it can be implemented as a constraint inside online/offline global planning tools to allocate unique last resort resources per service.

Therefore, the systems and methods of the present disclosure include several points of novelty with respect to the conventional systems. For example, the present embodiments provide an option on L0CP services to configure least preferred routes (e.g., last-resort routes, LRDTLSET, etc., as disclosed herein), which can be selected as a last resort after other routes are exhausted. The present disclosure is also configured to prioritize implicit routes over explicit least-preferred paths (e.g., cascaded routes) and add these routes in the last-resort set of routes to provide functionality to select regeneration-based paths as a last resort. Functionality of the systems and methods may include combining implicit path computation with last-resort routes (LRDTLSET), which may be extended to select a regeneration-based path.

Other aspects that may be understood as being novel with respect to conventional systems may include a best effort approach to ignore a particular route for restoration until the time that no other feasible routes are available, which may be done to define routes that constitute unreliable links as last-resort links or LR-DTL. Also, techniques, schemes, or algorithms can be implemented on a local Path Computation Engine (PCE), a L0CP control device (e.g., L0CP controller 10), Centralized Offline PCE, Centralized Online PCE, or other suitable devices.

The systems and methods may also include provisioning attributes via a Network Management System (NMS), Element (or Equipment) Management System (EMS), Network Element Management (NEM) system, etc. These can offer way to configure explicit routes as last resort route in the DTL for restoration purposes. The present embodiments provide the ability to specify paths traversing through unreliable links as last resort. Therefore, implicitly calculated routes may, at times (according to various embodiments), take precedence over explicitly defined routes.

As a result, the embodiment may help meet customer requirements, such as allowing regen routes to be used when there is no other feasible path available. This will minimize traffic impact or service degrade as LRDTLSET may contain routes that include unreliable links on which the customer may want a service to go only as a last resort. This feature could add unique value for NMS/EMS applications. The embodiments may be offered as an option to use a regeneration pool or unreliable set of links that can be preserved and utilized only as a last resort option, which can be a cost-effective solution to some conventional systems.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

The invention claimed is:
1. A system comprising:
a processing device, and
a memory device configured to store computer logic having instructions that, when executed, enable the processing device to
obtain a route list as defined by a user, the route list including a plurality of explicitly-configured backup routes for restoring service between a source node and a destination node in a network when a working route is unavailable,
receive input designating one or more of the plurality of explicitly-configured backup routes as one or more last-resort routes,
in response to determining that the working route is unavailable and that the plurality of explicitly-configured backup routes, excluding the one or more last-resort routes, are unavailable, automatically compute one or more implicitly-computed backup routes, and
for restoring service between the source node and destination node, utilize one of the one or more implicitly-computed backup routes before utilizing one of the one or more last-resort routes.

2. The system of claim 1, wherein the one or more last-resort routes include a path through a regeneration site where signals are regenerated.

3. The system of claim 1, wherein the one or more last-resort routes include a path through a link determined to be less reliable than other links in the network.

4. The system of claim 1, wherein the system is part of a Layer 0 Control Plane (L0CP) controller configured to compute the implicitly-computed backup routes and perform switching and routing procedures for optical signals in an optical network.

5. The system of claim 1, wherein the route list is a Designated Transit List (DTL).

6. The system of claim 1, wherein the instructions further enable the processing device to give the last-resort routes a lower priority in the route list than the other explicitly-configured backup routes.

7. The system of claim 1, wherein the route list includes an order that determines which route is attempted next for restoring service when routes higher in the order have been exhausted.

8. The system of claim 1, wherein the instruction further enable the processing device to
- pre-compute the one or more implicitly-computed backup route, and
- place the one or more implicitly-computed backup routes in the route list before the last-resort routes.

9. A non-transitory computer-readable medium configured to store computer logic having instructions that, when executed, cause one or more processing devices to:
- obtain a route list as defined by a user, the route list including a plurality of explicitly-configured backup routes for restoring service between a source node and a destination node in a network when a working route is unavailable;
- receive input designating one or more of the plurality of explicitly-configured backup routes as one or more last-resort routes;
- in response to determining that the working route is unavailable and that the plurality of explicitly-configured backup routes, excluding the one or more last-resort routes, are unavailable, automatically compute one or more implicitly-computed backup routes; and
- for restoring service between the source node and destination node, utilize one of the one or more implicitly-computed backup routes before utilizing one of the one or more last-resort routes.

10. The non-transitory computer-readable medium of claim 9, wherein the one or more last-resort routes include a path through a regeneration site where signals are regenerated.

11. The non-transitory computer-readable medium of claim 9, wherein the one or more last-resort routes include a path through a link determined to be less reliable than other links in network.

12. The non-transitory computer-readable medium of claim 9, wherein the implicitly-computed backup routes are computed using a Layer 0 Control Plane (L0CP) controller configured for performing switching and routing procedures for optical signals in an optical network.

13. A method comprising the steps of:
- obtaining a route list as defined by a user, the route list including a plurality of explicitly-configured backup routes for restoring service between a source node and a destination node in a network when a working route is unavailable;
- receiving input designating one or more of the plurality of explicitly-configured backup routes as one or more last-resort routes;
- in response to determining that the working route is unavailable and that the plurality of explicitly-configured backup routes, excluding the one or more last-resort routes, are unavailable, automatically computing one or more implicitly-computed backup routes; and
- for restoring service between the source node and destination node, utilizing one of the one or more implicitly-computed backup routes before utilizing one of the one or more last-resort routes.

14. The method of claim 13, wherein the one or more last-resort routes include a path through a regeneration site where signals are regenerated.

15. The method of claim 13, wherein the one or more last-resort routes include a path through a link determined to be less reliable than other links in network.

16. The method of claim 13, wherein the implicitly-computed backup routes are computed using a Layer 0 Control Plane (L0CP) controller configured for performing switching and routing procedures for optical signals in an optical network.

17. The method of claim 13, wherein the route list is a Designated Transit List (DTL).

18. The method of claim 13, further comprising the step of giving the last-resort routes a lower priority in the route list than the other explicitly-configured backup routes.

19. The method of claim 13, wherein the route list includes an order that determines which route is attempted next for restoring service when routes higher in the order have been exhausted.

20. The method of claim 13, further comprising the steps of:
- pre-computing the one or more implicitly-computed backup routes; and
- placing the one or more implicitly-computed backup routes in the route list before the last-resort routes.

* * * * *